United States Patent [19]

Hampton

[11] 4,330,140
[45] May 18, 1982

[54] MARINE RISER CONNECTOR

[75] Inventor: J. E. Hampton, Dallas, Tex.

[73] Assignee: Smith International, Inc., Newport Beach, Calif.

[21] Appl. No.: 217,337

[22] Filed: Dec. 17, 1980

Related U.S. Application Data

[63] Continuation of Ser. No. 793,778, Apr. 1, 1977.

[51] Int. Cl.³ .......................................... F16L 35/00
[52] U.S. Cl. ..................................... 285/39; 285/84; 285/90; 285/310; 285/362; 285/377; 285/391; 285/137 A
[58] Field of Search ....................... 285/18, 24, 27, 39, 285/358, 359, 25, 26, 28, 29, 137 R, 137 H, DIG. 21, 394, 395, 84, 90, 310, 362, 377, 391, 401; 175/7

[56] References Cited

U.S. PATENT DOCUMENTS

| | | | |
|---|---|---|---|
| 1,233,172 | 7/1917 | Berry | 285/359 |
| 2,087,180 | 7/1937 | Bohn | 285/359 |
| 3,198,555 | 8/1965 | Johnson et al. | 285/91 |
| 3,490,792 | 1/1970 | Piegza | 285/24 |
| 3,700,267 | 10/1972 | Piegza | 285/24 |
| 3,706,244 | 12/1972 | Wilmeth | 81/51.32 |
| 3,827,728 | 8/1974 | Hynes | 285/90 |
| 4,043,575 | 8/1977 | Roth | 285/137 A |
| 4,068,865 | 1/1978 | Shunks | 285/90 |
| 4,074,912 | 2/1978 | Bilderbeck | 285/86 |
| 4,097,069 | 6/1978 | Morrill | 285/39 X |

*Primary Examiner*—Dave W. Arola
*Attorney, Agent, or Firm*—Ned L. Conley; David Alan Rose

[57] ABSTRACT

A marine riser including a uniquely designed three element connection structure and associated connecting and releasing means for the inhibiting of fatigue failure caused by moments and axial loads resulting from relative motion between the fixed ocean bottom and a floating drilling platform or ship, such as a semisubmersible rig. The system includes a preloaded connection including a female member and a male member coaxially aligned and held in compression by a nut placed in tension. The connection holds riser pipe sections together. The connection is preloaded through a tool to a degree such that when a load equal to the yield strength of the pipe section material is applied to the pipe sections joined by the connector, the compressed faces of the male and female members do not separate from each other. The degree of preload would be sufficient to maintain the contact between the compressed faces under expected working loads of the pipe sections. The tool operates in conjunction with lugs located on the nut and a flange or platform with mounting holes located on the male member. A lock is provided on the nut to prevent the disengagement of the male and female members after they are brought into compression by the nut. The position of the lock relative to the nut lugs determines the sustained preload of the connection. Seals are provided between the male and female member to prevent leakage of fluid between the interior of the riser connector and the surrounding environment. The connector also includes provision for the support and connection of sections of kill and choke lines.

27 Claims, 9 Drawing Figures

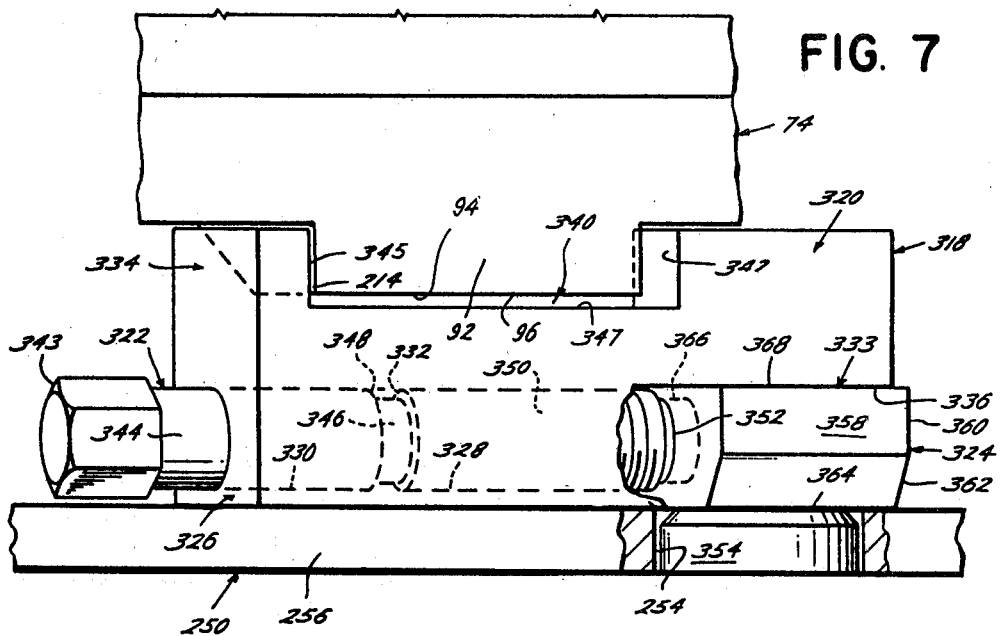
FIG. 7
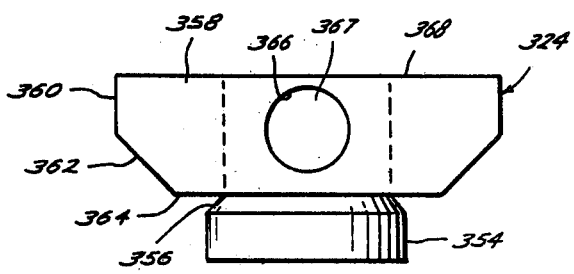
FIG. 8
FIG. 9
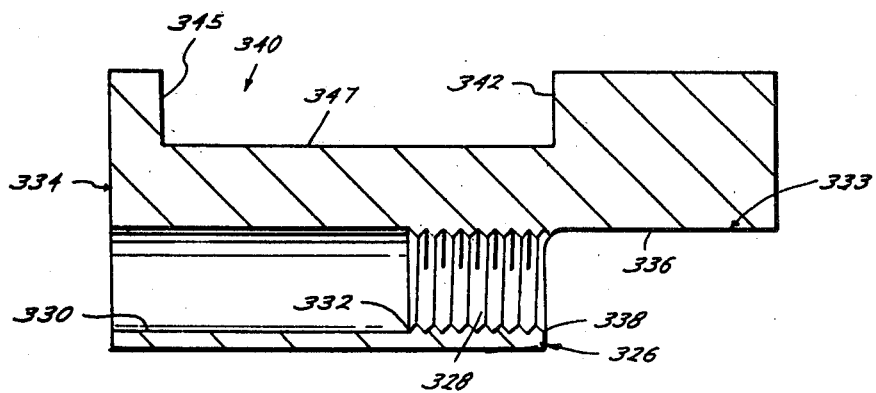

MARINE RISER CONNECTOR

CROSS REFERENCE TO RELATED APPLICATIONS

This is a continuation of application Ser. No. 793,778, filed Apr. 1, 1977.

This application is one of several related applications pertaining to Marine Riser Connectors. The inventive entity of the present application is informed and believes that the relationship of the several applications is as follows:

The invention of Ser. No. 783,778, filed Apr. 1, 1977 (Case I) was conceived by J. E. Hampton, as shown by the drawing of the annexed Exhibit A. The conception of Case I was modified by several employees of McEvoy Oilfield Equipment Co. (Assignee) for the purposes of producing a commercial embodiment.

The invention of Ser. No. 674,775, filed Apr. 8, 1976 (Case II) was conceived by Charles D. Morrill as part of these modifications.

The invention of Ser. No. 694,187, filed June 9, 1976 (Case III) was conceived, as shown by the drawings of the annexed Exhibit B, by Robert D. Barnett, Charles D. Morrill and Andre H. Drouin as part of these modifications.

The disclosure of the preferred embodiment does not precisely reflect Exhibit A or Exhibit B. It is a modification of the foregoing resulting from the design of the commercial embodiment and testing.

Case I is presently directed to a marine riser connector and pipe.

Case II is presently directed to, among other things, improvements to the structure of the marine riser connector and pipe.

Case III is directed to an improved tool.

Between the conception of Case I and the further design by employees of McEvoy, the design was transmitted to employees of Earl and Wright Consulting Engineers, and particularly Robert Grant. Stress concentration calculations were performed by the employees of Earl and Wright to parametrically size the nut and male and female members of the connection and choose a design point. These calculations are shown by the annexed Exhibit C, but some of the equations are subject to question, including the power of Poisson's Ratio in equation (3) and the formula for R in equation (4). The particular design point selected by the employees of Earl and Wright was not used and does not form a part of the inventions of Cases I, II, and III.

BACKGROUND OF THE INVENTION

1. Field of the Invention

The present invention relates to a marine riser connector. The invention has been found to be particularly useful in the connection of riser sections in a long string of low pressure service pipe between a floating vessel, such as, for example, a semisubmersible rig, and the ocean bottom, and hence, will be discussed with particular reference thereto. However, the invention is also applicable to other types of risers requiring sealing and high resistance to structural yield as the result of stress oscillation.

2. Description of the Prior Art

When floating drilling rigs, such as, for example, semisubmersible rigs, are operating in deep water, such as, for example, more than 300 feet of water, to drill a well, there are many problems associated with the design of marine risers connecting the drilling rig at the surface to the well located at the ocean bottom. The requirements of marine risers used with a floating drilling rig differ from those of risers used with a fixed platform drilling rig due to the moving point of connection at the surface for the riser for a floating drilling rig, both types having a rigid bottom connection at the ocean floor.

For a floating drilling rig, the well is completed at the mudline. Mudline completion is essential where floating drilling rigs are used, otherwise, there would be an open hole between the ocean floor and the floating vessel with the potential that the floating vessel would have to move off the hole, thereby leaving a hazard for pollution. Additionally, the weight of a riser adapted for high pressure service, if the well was not completed at the mudline, would be prohibitive to transport and support. Blowout preventers are, therefore, located at the wellhead, rather than on the rig, allowing the use of a low pressure riser system to connect the wellhead with the drilling vessel. The low pressure riser system is subject to a pressure differential between the static head of the water surrounding the riser and the drilling mud used to resist pressure in the well. To control the well, choke and kill lines must be strung externally to the drilling portion of the riser and as part of the riser and used in combination with drill pipe located inside the drilling portion of the riser. The riser system is, therefore, a series of sets of pipe sections connected at two common connection points to other sets of similar pipe sections, forming a continuous, fluid tight set of flow conduits from the ocean bottom to a floating platform.

Because of the large distances between the floating drilling rig and the mudline wellhead and because of the movement of the rig, such a riser system and the individual sections thereof will tend to cyclically bend, even though riser tensioners and other structures are provided to minimize the load cycles and degree of bend. Fatigue failure has been experienced by riser connectors between such riser sections as the result of such movement. See, *Petroleum Engineer,* October, 1974, Pages 36–46; *Petroleum Engineer,* Nov. 15, 1974, Pages 68–74; *Petroleum Engineer,* December, 1974, Pages 52–65; *Petroleum Engineer,* January, 1975, Pages 52–60; *Petroleum Engineer,* February, 1975, Pages 10–17; *Petroleum Engineer,* March, 1975, Pages 52–67; and Transactions of the Fortieth Annual Meeting of the Society of Petroleum Engineers of AIME, Paper SPE 1220.

Several types of pipe and tool joints have been known and used before, and typical examples thereof are shown in:

*Composite Catalog of Oilfield Equipment and Services,* 1974-75, Vol. 3, Pages 3984, 4260-64, 4987, published by World Oil;

*Composite Catalog of Oilfield Equipment and Services,* 1974-75, Vol. 2, Page 1913, published by World Oil;

*Composite Catalog of Oilfield Equipment and Services,* 1974-75, Vol. 1, Pages 1138A-1138B, 1635-38 published by World Oil;

Vetco General Catalog, 1974-75, Pages 5186-89,5204;

*Composite Catalog of Oilfield Equipment and Services,* 1972-73, Vol. 3, Pages 3192, 3284, 3286, 3318-19, 3326, 3692, 3694, 3912, 3914-15, 4379, 4509, 4520-23, 4529-32, 4660, published by World Oil;

*Rucker Catalog of Pressure Control Equipment Motion Compensation and Tension Control Systems,* Page 4455;

*General Catalog OCT Wellhead Equipment* 1974-75, Page 1954;

*O.C.T. Flow Fittings and Related Equipment,* Page 25;

*Composite Catalog of Oilfield and Equipment Services,* 1972-73, Vol. 2, Pages 1856, 2246, 2416, 2490, 2581, 3110, published by World Oil;

*Composite Catalog of Oilfield and Equipment Services,* 1970-71, Vol. 3, Pages 3514, 3600-02, 3864, 4156-58, 4667-72, 4824, 4828-32, 4885-89, published by World Oil;

*Composite Catalog of Oilfield and Equipment Services,* 1970-71, Vol. 2, Page 2255, published by World Oil;

*Composite Catalog of Oilfield and Equipment Services,* 1970-71, Vol. 1, Pages 245, 270, 756-57, 871, 992, 1821, published by World Oil;

*Armco National Oil Field Products Composite Catalog,* 1974-75, Page 3725;

*Regan Forge & Engineering Company Catalog,* Pages 4156-58;

*Vetco Catalog,* Pages 5196-98;

U.S. Pat. Nos.:
- 3,853,338—issued Dec. 10, 1974, to William W. Wilson
- 3,853,339—issued Dec. 10, 1974, to William W. Wilson
- 3,827,728—issued Aug. 6, 1974, to J. H. Hynes;
- 3,844,589—issued Oct. 29, 1974, to G. E. Bram;
- 3,838,873—issued Oct. 1, 1974, to S. J. Gilbert;
- 3,844,585—issued Oct. 29, 1974, to R. E. Sands, et al;
- 2,825,585—issued Mar. 4, 1958, to C. L. Griffin;
- 3,754,609—issued Aug. 28, 1973, to W. R. Garrett;
- 2,636,753—issued Apr. 28, 1953, to C. L. Griffin;
- 2,982,355—issued May 2, 1961, to O. N. Rodgers;
- 3,345,084—issued Oct. 3, 1967, to J. W. E. Hanes, et al;
- 3,345,085—issued Oct. 3, 1967, to J. W. E. Hanes;
- 3,098,667—issued July 23, 1963, to E. C. Greenwood;
- 2,924,434—issued Feb. 2, 1960, to R. R. Potter, et al;
- 1,539,287—issued May 26, 1925, to R. A. Wilson;
- 1,605,314—issued Nov. 2, 1926, to R. A. Wilson;
- 1,507,877—issued Sept. 9, 1924, to R. A. Wilson;
- 1,605,315—issued Nov. 2, 1926, to R. A. Wilson;
- 1,614,815—issued Jan. 18, 1927, to R. A. Wilson;
- 1,629,058—issued May 17, 1927, to R. A. Wilson;
- 1,637,628—issued Aug. 2, 1927, to Edwin C. Weisgerber;
- 1,668,921—issued May 8, 1928, to P. Miks;
- 1,645,032—issued Oct. 11, 1927, to R. A. Wilson;
- 1,671,458—issued May 29, 1928, to R. A. Wilson;
- 2,049,290—issued July 28, 1936, to E. Burns, et al;
- 2,107,716—issued Feb. 8, 1938, to J. C. Singleton;
- 2,228,243—issued Jan. 14, 1941, to R. C. Baker;
- 3,421,580—issued Jan. 14, 1969, to J. H. Fowler, et al;
- 3,442,536—issued May 6, 1969, to J. H. Fowler;
- 3,224,799—issued Dec. 21, 1965, to T. L. Blose, et al;
- 3,114,566—issued Dec. 17, 1963, to C. J. Coberly, et al;
- 2,931,670—issued Apr. 5, 1960, to W. L. Church;
- 2,907,589—issued Oct. 6, 1959, to G. S. Knox;
- 1,469,009—issued Sept. 25, 1923, to C. Overstreet;
- Canadian Pat. No. 469,786—issued Nov. 28, 1950, to Louis Edmund Edwards.

None of these, however, teaches a quick stabbing riser connector for long riser strings connecting choke and kill lines and pipe sections through the use of a male member, a female member with a nut thereabout, the members and nut being preloaded through the use of multiple broken threads on the male member and the nut. They, therefore, do not solve the problem of failure of a nut type riser connection because of fatigue.

Several other types of connection devices have been known and used before, and typical examples thereof outside the riser string or tool coupling art and not employing nuts are shown in:

U.S. Pat. Nos.:
- 2,773,707—issued Dec. 11, 1956, to J. Fraser;
- 1,080,675—issued Dec. 9, 1913, to P. Berg;
- 1,019,558—issued Mar. 5, 1912, to K. H. Thompson;
- 2,283,974—issued May 26, 1942, to S. V. Dillon;
- 1,910,161—issued May 23, 1933, to G. G. Harrington;
- 725,337—issued Apr. 14, 1903, to C. H. Haeseler;
- Re.21,234—issued Oct. 17, 1939, to W. L. Church; and
- 2,645,438—issued July 14, 1953, to I. Kalikow;
- 183,891—issued Oct. 31, 1876, to J. G. L. Boettcher;
- 314,783—issued Mar. 31, 1885, to G. W. Beebe;
- 906,217—issued Dec. 8, 1908, to E. G. Gaylord;
- 1,008,551—issued Nov. 14, 1911, to W. A. Lorenz;
- 1,311,145—issued July 22, 1919, to W. Zeindler, et al;
- 222,713—issued Dec. 15, 1879, to W. A. Lawson;
- 2,039,787—issued May 5, 1936, to N. O. Fogelstrom;
- 2,066,956—issued Jan. 5, 1937, to G. H. Williams;
- 2,627,429—issued Feb. 3, 1953, to H. C. Engelman;
- 290,663—issued Dec. 25, 1883, to D. S. Blue;
- 2,539,456—issued Jan. 30, 1951, to G. Meier;
- 3,275,354—issued Sept. 27, 1966, to W. N. Sutliff, et al;
- 3,116,942—issued Jan. 7, 1964, to W. Morello, Jr.;
- 2,828,662—issued Apr. 1, 1958, to J. A. Antal;
- Re.13,222—issued Mar. 28, 1911, to C. H. Chapman;
- British Pat. No. 15,375—issued June 28, 1897, to Craig;
- Swiss Pat. No. 373,608—issued Jan. 15, 1964, to Auguste Ernest Chevalley; and
- Canadian Pat. No. 642,982—issued June 19, 1962, to Harl Remington.

None of these devices, however, teaches the use of a male and female member with a nut, the members in compression and the nut in tension.

Several types of pipe and equipment couplings using a male and female member in conjunction with one or more nuts, some including lugs, have been known and used before, and typical examples thereof are shown in:

U.S. Pat. Nos.:
- 3,848,905—issued Nov. 19, 1974, to V. S. Hammer, et al;
- 2,295,716—issued Sept. 15, 1942, to O. C. Cox;
- 787,154—issued Apr. 11, 1905, to J. J. Delehant;
- 774,667—issued Nov. 8, 1904, to W. S. Houser;
- 3,014,740—issued Dec. 26, 1961, to J. D. Bogsian, et al;
- 3,851,901—issued Dec. 3, 1974, to Cecil M. Sills;
- 3,827,732—issued Aug. 6, 1974, to M. Noguchi, et al;
- 3,480,300—issued Nov. 25, 1969, to W. C. Jeffery, et al;
- 2,684,860—issued July 27, 1954, to A. W. Rafferty;
- 112,958—issued Mar. 21, 1871, to J. B. Ramp;
- 633,324—issued Sept. 19, 1899, to C. Luke;
- 1,034,781—issued Aug. 6, 1912, to J. Gapp;
- 1,853,411—issued Apr. 12, 1932, to H. L. Gentry, et al; and
- 1,866,863—issued July 12, 1932, to L. L. Richardson.

Great Britain Pat. No. 1,109,623—issued June 15, 1966, to Ritter Pfandler Corporation.

None of these, however, show a riser joint capable of high prestress on mating shoulders.

SUMMARY OF THE INVENTION

The present invention uses a very simple but highly effective design for a preloaded connector to connect pipe sections of a marine riser from a fixed well head to a floating platform. It includes a male member, a female member and nut, with a platform connected to the male member for use in preloading the connector. The nut is used to maintain abutment of hub faces of the male and female members. The present invention, while utilizing a three member connection, utilizes the members to obtain a quick stab connection. The connection, when made up, maintains a low pressure seal and inhibits fatigue failure of the connector by preloading. The connection is preloaded, with the nut placed under tension, so that, when load equal to the yield strength of the pipe is applied to the pipe sections, the male and female members remain abutting. Therefore, the contact between the compressed faces of the male and female members will be maintained under expected working loads on the pipe sections.

In the preferred embodiment, the low pressure seal is located to permit easy insertion and inspection. It is not subject to wear as a result of rotational forces and rubbing when the connector is preloaded.

In the preferred embodiment, the choke and kill line seqments of the riser are also supported by the connector and may be attached to other choke and kill segments prior to connector preloading.

In the preferred embodiment, a portable, mechanical preload tool is used to preload the connector.

BRIEF DESCRIPTION OF THE DRAWINGS

For a further understanding of the nature and objects of the present invention, reference should be had to the following detailed description, taken in conjunction with the accompanying drawings, in which like parts are given like reference numerals and wherein:

FIG. 7 is a side view, partially in elevation, partially in cross-section, partially in phantom line of the preload tool of the preferred embodiment of the apparatus of the present invention;

FIG. 8 is a front view of the block of the preload tool of the preferred embodiment of the apparatus of the present invention; and FIG. 9 is a side cross-sectional view of the body of the preload tool of the preferred embodiment of the apparatus of the present invention.

DETAILED DESCRIPTION OF THE PREFERRED EMBODIMENT

The preferred embodiment of the marine riser connector of the present invention may be used to connect low pressure marine riser sections between a floating drilling vessel and the ocean bottom wherein it is important that the connector, using a male and female member held by a nut, not experience fatigue failure under load oscillations of the riser sections. A particularly important area of application of the present invention is in deep wells having blow out equipment on the ocean bottom wherein positive seals must be kept at all times and provision must also be made for supporting well control choke and kill lines.

In the preferred embodiment of the present invention, the riser section connection is accomplished through the use of a female member, attached to one pipe section, placed in compressive relationship with a male member, attached to another pipe section, by a nut. The nut is placed in tension by a tool so that when load equal to the yield strength of the pipe is applied to the pipe sections, the male and female members remain abutting. A platform connected to the male member is used, in conjunction with the tool, to preload the connection to the appropriate compressive and tensile force.

A sealing element is provided on the male member to form a seal against an internal wall of the female member to prevent leakage.

The members and nut support choke and kill line sections.

Structure and Its Method of Use

Overview of Structure

Figure 1:
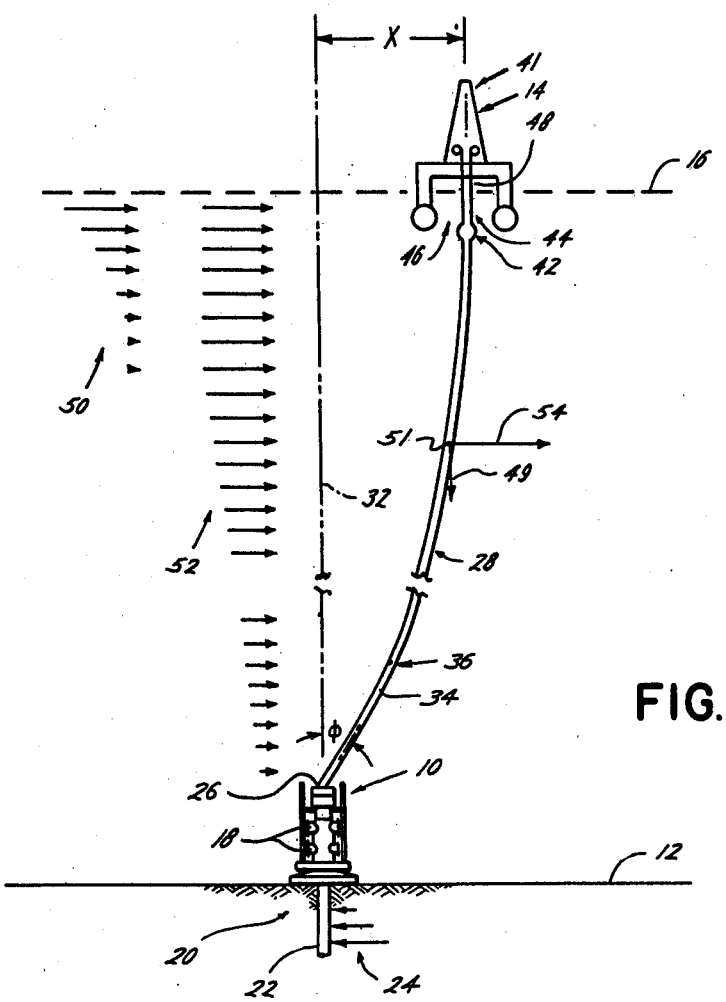
FIG. 1 is a schematic view of one installation of the apparatus of the present invention.

Referring to FIG. 1, there is shown a perspective view of a riser system connecting well head 10 at the ocean bottom 12 with floating drilling platform 14 at the ocean surface 16.

Well head 10 includes blow out preventers 18 and other equipment (not shown) necessary for the completion of an undersea well, as is well known in the art. Extending downwardly from well head 10 into the ocean bottom 12 is conductor string 20 including surface casing 22 supported by ocean bottom 12 as shown generally by force arrows 24 of FIG. 1. Located at the top of well head 10 is bottom ball joint 26 with riser 28 attached thereto. Bottom ball joint 26 is sized to permit rotation of riser 28 with respect to the fixed portion of ball joint 26. This rotation may cause excursion of riser 28 from the vertical line 32 concentric with the well head 10, which may be measured at any point, as shown schematically in two dimensions in FIG. 1, by an angle $\phi$ between vertical line 32 and the tangent to the riser and distance X from the vertical line 32.

Figure 2:
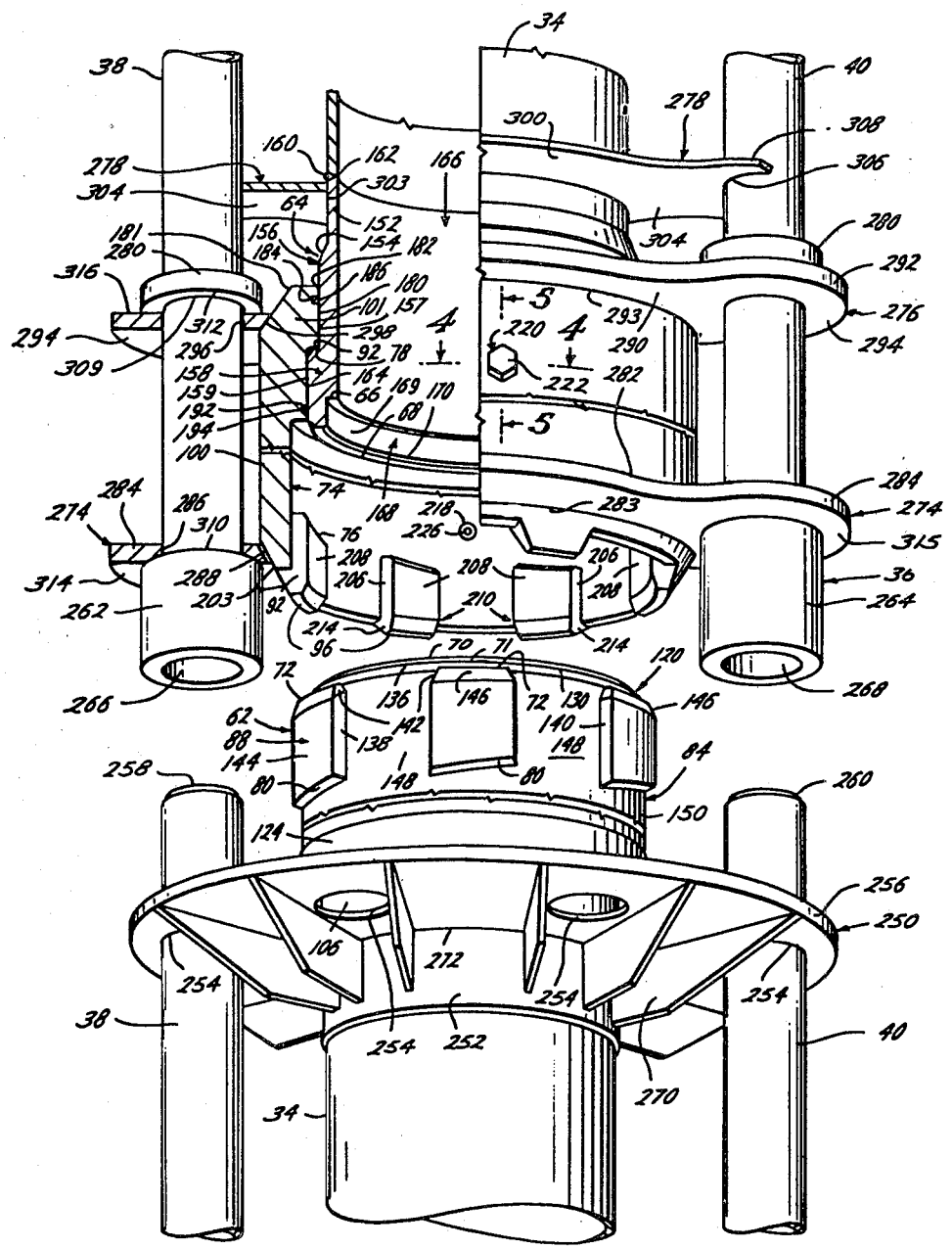
FIG. 2 is an isometric view, partially in cross-section, of a preferred embodiment of the apparatus of the present invention showing the connector before the nut and female member are joined with the male member.

Riser 28 extends from ball joint 26 upwardly toward the ocean surface 16. Riser 28 includes large diameter sections 34 of riser pipe (FIG. 2) connected by riser connections 36. Because the blow out preventers 18 are located at the ocean bottom, for economy, and also because no other pressure is exerted on the riser pipe, sections 34 usually have a thickness suitable only for the low pressure differentials between the hydrostatic head of the ocean and the pressure of the drilling mud (not shown) within the sections 34. Riser sections 34 are of sufficient diameter to enclose the bundle of vertical flow lines used for well production, drilling, testing, and completion (not shown). The number and size of such flow lines, for example, in a production riser, depends upon the subsea manifolding scheme (not shown) and processing method. Referring to FIG. 2, riser 28 further includes choke line 38 and kill line 40 rising from well head 10 to the surface 16 of the ocean. These lines are of suitable thickness for the containment of high pressure fluids to control the well. Choke line 38 and kill line 40 are external to pipe sections 34.

The upper end of riser 28 terminates at upper ball joint 42. Upper ball joint 42 connects to drilling equipment 41 on floating drill rig 14 by slip joint 44 within drill well 46. Riser tensioners 48, for exmaple, of the direct or remote actuated type, included with slip joint 44, are also provided.

Riser tensioners 48 have sufficient strength to maintain the tension of riser 28 under gravity force indicated by force arrow 49 acting on the center of gravity 51, under buoyant forces acting on the center of buoyancy (not shown), and under wave and current action on the riser 28 and the floating drilling rig 14, as indicated by force arrows 50 and 52, respectively. The resultant horizontal force of forces 50, 52 is indicated by force arrow 54 acting on the center of gravity 51.

Referring to FIG. 2, riser connector 36 comprises three substantially coaxial components: male member 62, female member 64, and nut 74. When connector 34 is assembled, male member 62 and female member 64 abut, with shoulder 66 of second counterbore 168 of female member 64 in contact with the surface 70 of male extension 120 of male member 62. Also, when connector 36 is assembled, surface 68 of female member 64 is in close proximity to shoulder 72 of male member 62. Male extension 120 is further provided with O-rings 136 to sealingly engage interior wall 169 of second counterbore 168 of female member 64. Nut 74 has lugs 92 with internal shoulders 76 abutting inclined surface 80 of male member 62 when connector 26 is assembled. Nut 74 further includes internal shoulder 78 abutting external shoulder 82 of female member 64 when connector 36 is assembled. Upper inner surface 180 of beveled section 101 of nut 74 is in contact with surface 157 of female member 64.

Male Member Structure

Figure 3:
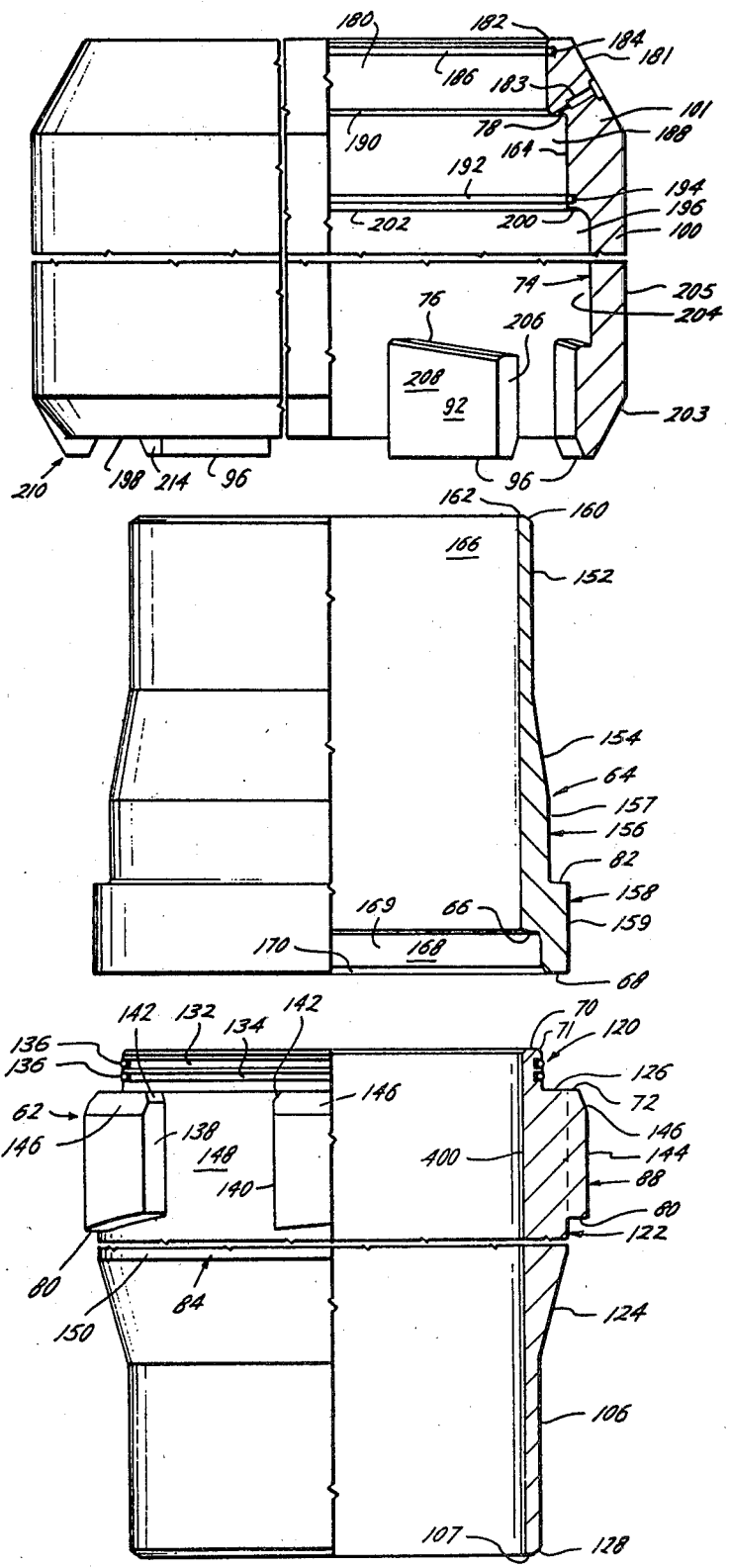
FIG. 3 is an exploded side view of the connector partially in cross section, partially in elevation of the preferred embodiment of the apparatus of the present invention.

Referring to FIG. 3, there is shown male member 62 having male extension 120, body section 122, including lugs 88 and body 84, tapered section 124 and pipe mating section 106. Male extension 120 includes upper surface 70 beveled at 71. Male extension 120 joins body 84 at shoulder 126. The length of male extension 120 from surface 70 to shoulder 126 is approximately equal to the length of second counterbore 168 of the female member 64 from shoulder 66 to surface 68 (FIG. 2). The width of surface 70 is substantially equal to the width of shoulder 66 of female member 64 (FIG. 2). Male extension 120 also includes O-ring groves 132, 134 sized to receive O-rings 136 therein.

Lugs 88 inclue front face 144 and straight sides 138, 140 of unequal length adjoining front face 144 and body 84. Side 140 is longer than side 138 thereby forming lower inclined surface 80. The upper inclined corners 142 of sides 138, 140 are beveled inwardly toward and connecting to top surface 72. Front face 144 of lug 88 has inwardly beveled upper corner portion 146 attaching to and completing the boundary of top surface 72.

Facing sides 138 and 140 of adjacent lugs 88 are separated to form slots 148. The width of slots 148 is sized to permit passage of lugs 92 of nut 74 between sides 138, 140 of adjacent lugs 88. Below lower inclined surfaces 80, body 84 further includes lower surface 150 of approximately the same length as the face 208 of lugs 92 of nut 74. Pipe mating section 106 is of substantially the same radius as pipe sections 34, and has edge 107 and bevel 128 shaped to attach by welding to a pipe section 34 (FIG. 2). The thickness of the body 84 of male member 62 measured from inner surface 400 to surface 148 is, for example, 2.00 inches for a pipe thickness of 0.4375 inches. The lug thickness is for example, 0.9 inches for the same pipe thickness.

Female Member Structure

Referring to FIG. 3, there is shown female member 64 having pipe mating section 152, inclined portion 154, body 156, and nut support section 158. Pipe mating section 152 includes bevel 160 and planar surface 162 shaped to attach by welding to a pipe section 34 (FIG. 2). Bore 166 is formed by drilling, rolling or other process in female member 64 approximately parallel to surface 152. Counterbore 168, larger than bore 166 and having interior wall 169, is formed by drilling, rolling or other process in surface 68. body 156 is substantially cylindrical, having smooth side 157 of approximately the same length as the length of inner face 180 of beveled section 101 of nut 74. Nut support section 158 is located at the lower end of body section 156 forming shoulder 82. Outward facing shoulder 82 is of substantially the same width as internal shoulder 78 of nut 74. Nut support section 158 further includes substantially cylindrical outer surface 159. Wall 169 is substantially parallel to surface 159. Counterbore 168 extends only partially into nut support section 158 forming shoulder 66 with bore 166. The end 170 of counterbore 168 opposite shoulder 166 is beveled outward sufficiently such as, for example, fifteen degrees from the vertical, to cooperate with bevel 71 of male member 62 for insertion of male extension 120 into counterbore 168.

Nut Structure

Referring to FIG. 3, there is shown nut 74 having tapered lugs 92, body 100 and and beveled section 101.

Bore 180 is formed by drilling, rolling or other means in beveled section 101. Upper, inner edge 182 of bore 180 is beveled to facilitate easy withdrawal of engagement of nut 74 from female member 64. Bore 180 includes O-ring groove 184 sized to receive O-ring 186 therein to sealingly engage outer surface 157 of female member 64.

Beveled section 101 further includes outwardly facing conical section surface 181 with oppositely positioned eyebolt sockets 185 (FIG. 6) therein of sufficient width to support eyebolts (not shown) for handling nut 74. Beveled section 101 may also have grease fitting 183 formed therein by drilling or other means through conical surface 181 and shoulder 78 for lubricating shoulder 78, if desired.

First counterbore 188 of larger diameter than and substantially coaxial with bore 180 is formed by drilling, rolling or other means in beveled section 101 and body 100. Shoulder 78 is thereby formed between bore 180 and first counterbore 188. First counterbore 188 includes inner wall 164. Beveled edge 190 is also formed at the inner end of shoulder 78 to facilitate insertion of female member 64 into bore 180. First counterbore 188 includes groove 192 sized to receive O-ring 194 therein to sealingly engage outer surface 159 of female member 64.

Second counterbore 196 is formed by drilling, rolling or other suitable means through lower surface 198 of nut 74. It is of larger diameter and substantially coaxial with first counterbore 188. Second counterbore 196 is bounded by inner wall 204 of cylindrical body 100 of nut 74. Second counterbore 196 forms rounded shoulder 200 at the boundary between first counterbore 188 and second counterbore 196. Beveled edge 202 is formed at the inner end of shoulder 200 to facilitate insertion of female member 64 into nut 74. Body portion 100 further includes beveled lower portion 203. The thickness of nut 74, measured from inner surface 204 to the outer surface 205, may be, for example, 1.75 inches for a pipe thickness of 0.4375 inches.

The portion of body 100 between shoulder 78 and surface 76 is of sufficient length to permit the engagement of shoulder 78 with shoulder 82 of female member 64 and the engagement of surface 76 with surface 80 of male member 62 without the engagement of shoulder 200 with surface 72 of male member 62.

Lugs 92 are located at the end of body 100 opposite beveled section 101. Lugs 92 are shaped by milling or other means. Upper surfaces 76 of lugs 92 are inclined.

Upper surfaces 76 are pitched to mate with surfaces 80 of lugs 88 of male member 84 and urge surfaces 80 upward such as, for example, one one-thousandth of an inch compressive axial movement of surface 80 for one-quarter inch rotational movement of lugs 92.

Lugs 92 also include side surfaces 206 and inward facing surface 208. Surfaces 206, 208 are substantially vertical, terminating at the lower end at lug projection portion 210. Inward facing surface 208 also terminates at beveled surface 211 directly below upper surface 76.

Lug projection portion 210 extends below beveled lower portion 203. It includes outward facing end 212 of substantially the same slope as beveled lower portion 203. Lug projection portion 210 further includes substantially vertical sides 214. It also includes inward facing chamfered surface 216 to facilitate the engagement of nut 74 with female member 64. The sides and ends of lug projections 210 form downward facing surfaced 96.

Locking Structure

Referring now to FIGS. 2, 4, 5, 6, opposite facing holes 218 of suitable size to receive threaded bolt lock 220 are drilled and tapped through body 100 of nut 74. The holes 218 are circumferentially separated on body 100 by approximately 180°. Threaded bolt lock 220 includes a head 222, a threaded section 224, and a lug 226. Head 222 may be of any shape, such as, for example, a hexoganal shape. Threaded section 224 has a thread pitch matching the thread pitch of hole 218 and connects lug 226 with head 222. Lugs 226 are located with respect to lugs 92 to determine the preload amount of compression between male and female members 62, 64 and the tensile load on nut 74. The position of lug 226 relative to lug 96 may be set, for example, to cause a preload on the connection requiring an expected working load on pipe sections 34 approximately equal to the yield strength of pipe sections 34 before surface 68 separates from surface 126. Threaded section 224 may also include a Teflon ring or insert (not shown) for preventing rotation caused by vibration.

Figure 4:
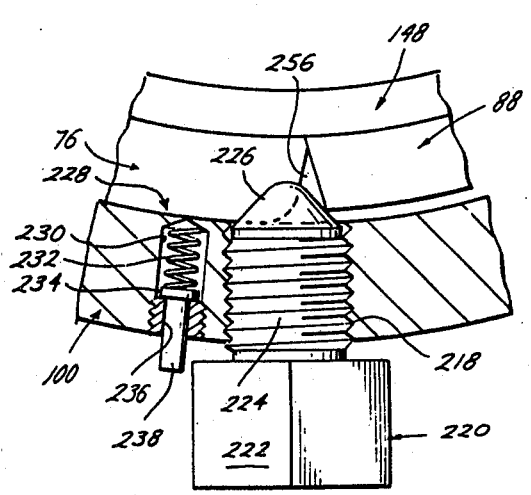
FIG. 4 is a top, sectional view taken along section lines 4-4 of FIG. 2 showing the locking and anti-rotation mechanism.
Figure 5:
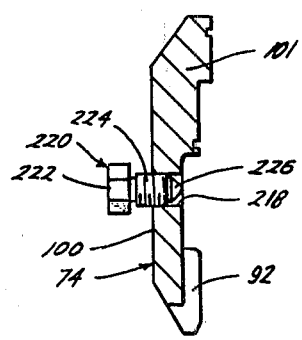
FIG. 5 is a side, sectional view taken along section lines 5—5 of FIG. 2 showing the locking mechanism.
Figure 6:
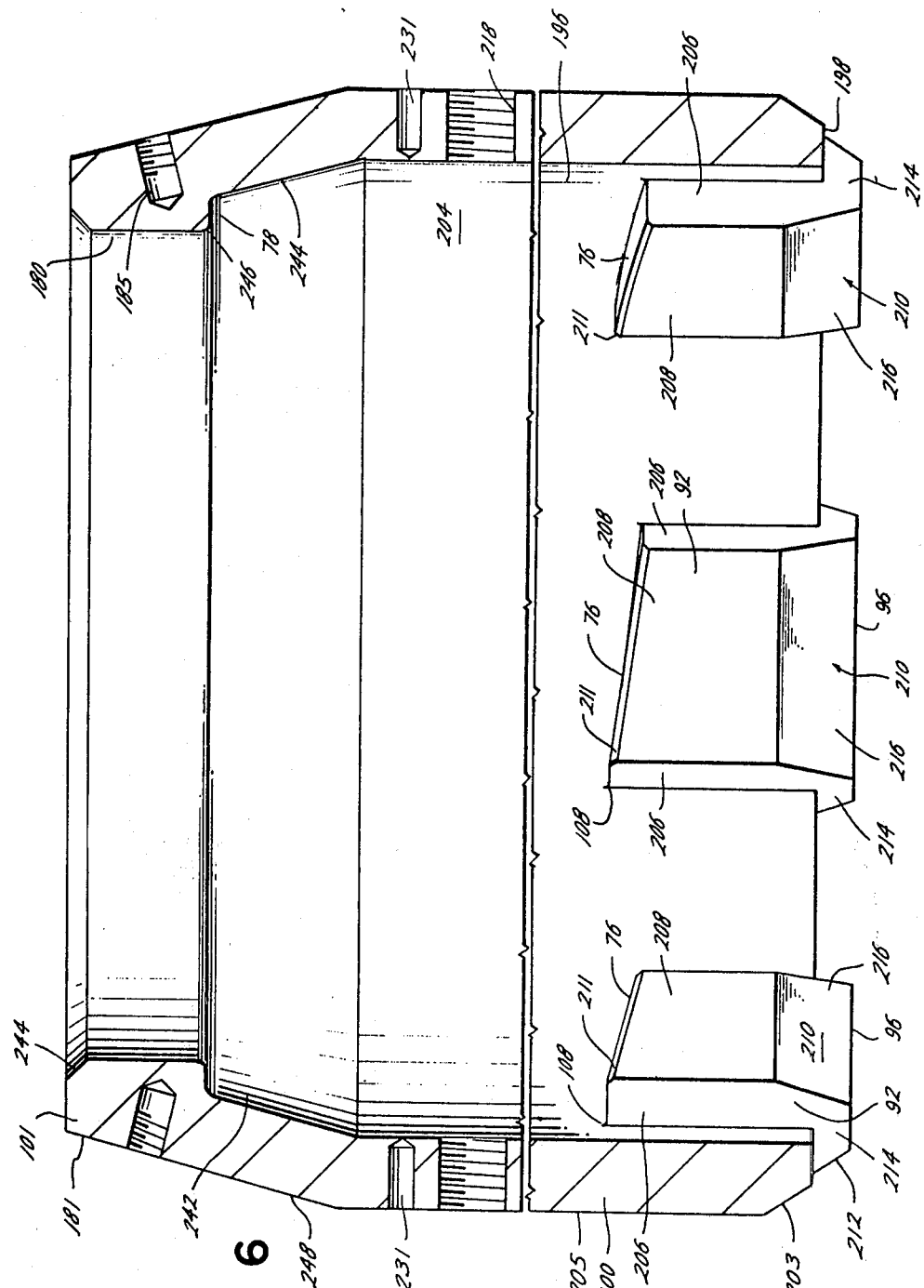
FIG. 6 is a side cross-sectional view of an alternate nut for the connector of the preferred embodiment of the apparatus of the present invention.

Referring to FIG. 4, nut 74 is further provided with lock holders 228 in holes 230 or holes 231 (FIG. 6). Lock holders 228 are positioned in holes 230, 231 drilled into, but not through, body 100. The holes 230, 231 are separated along the circumference of body 100 by approximately 180°. Lock holder 228 includes spring 232 held in hole 230, 231 by threaded assembly 236. Plunger 238 of, for example, square cross section, is transversely, telescopically engaged with threaded assembly 236. It is attached to spring 232 by nuts 234. Hole 230, 231 is fixed in circumferential relation to hole 218 so that bolt head 222 will overlap the corners of plunger 238 during locking engagement thereby preventing rotation of bolt head 222.

Alternate Nut Structure

An alternate nut configuration is shown in FIG. 6. This structure eliminates seals 186, 194, changing the shape of surface 164 to lighten the weight of the nut. Referring now to FIG. 6, there is shown nut 240 having tapered lugs 92 attached to body 100, beveled section 101, and inclined portion 242 having substantially the same slope as the beveled outer surface 181 of beveled section 101.

Bore 180 is formed by drilling, rolling or other means in beveled section 101. Upper inner edge 244 of bore 180 is beveled to facilitate withdrawal of engagement of nut 74 from female member 64 while eliminating some weight.

Beveled section 101 further includes outwardly facing conical section surface 181 with oppositely positioned eyebolt sockets 185 therein of sufficient width to support eyebolts (not shown) for handling nut 74.

Conical shaped section 242, substantially coaxial to bore 180, with sloped inner sides 244 of larger diameters than bore 180, is formed adjacent to beveled section 101. Outer surface 248 of conical shaped section 242 is of substantially the same slope as surface 181 thereby forming combined sloped surface 181, 248. Shoulder 78 is thereby formed between bore 180 and conical section 242. Beveled edge 246 is also formed at the inner end of shoulder 78 to facilitate insertion of female member 64 into bore 180.

Second counterbore 196 is formed through lower surface 198 of nut 240. It is of larger diameter and substantially coaxial with conical section 242. Second counterbore 196 is bounded by inner wall 204 of cylindrical body 100 of nut 240. Body portion 100 further includes beveled power portion 203. The thickness of nut 74, measured from inner surface 204 to the outer surface 205, may be, for example, 1.75 inches for a pipe thickness of 0.4375 inches.

The portion of body 100 between shoulder 78 and surface 76 and between surface 76 and sloped sides 244 of conical section 242 is of sufficient length to permit the engagement of shoulder 78 with shoulder 82 of female member 64 and the engagement of surface 76 with surface 80 of male member 62 without the engagement of sloped sides 244 with surface 72 of male member 62.

Lugs 92 are located at the end of body 100 opposite conical section 242. Lugs 92 are shaped by milling or other means. Upper surfaces 76 of lugs 92 are inclined and attached to inner wall 204 of body 100.

Upper surfaces 76 are pitched to mate with surfaces 80 of lugs 88 of male member 84 and urge surfaces 80 upward such as, for example, one one-thousandth of an inch compressive axial movement of surface 80 for one-quarter inch rotational movement of lugs 92.

Lugs 92 also include side surfaces 206 and inward facing surface 208. Surfaces 206, 208 are substantially vertical, terminating at the lower end at lug projection portion 210. Inward facing surface 208 also terminates at beveled surface 211 directly below upper surface 76.

Lug projection portion 210 extends below beveled lower portion 203. It includes outward facing end 212 of substantially the same slope as beveled lower portion 203. Lug projection portion 210 further includes substantially vertical sides 214. It also includes inward facing, chamfered surface 216 to facilitate the engagement of nut 74 with female member 64. The sides and ends of lug projections 210 form downward facing surface 96.

Opposite facing holes 218 of suitable size to receive threaded bolt lock 220 are drilled and tapped through body 100. The holes 218 are circumferentially separated on body 100 by approximately 180°. The threaded bolt lock 220 and lock holder 228 are the same structure as previously described, except that holes 230 are positioned above holes 218 instead of their being in approximately the same horizontal plane.

Kill and Choke Line Support Platform Structure

Referring to FIG. 2, there are shown two sections of choke line 38 and kill line 40 having beveled ends 258, 260 respectively at their upward end and collars 262, 264 respectively at their lower end. These sections are suspended in fixed relation to male member 62 by lower platform 250. Collars 262, 264 have openings 266, 268 respectively therein to telescopically receive, by screw connection or other suitable means, beveled ends 258, 260 respectively.

Lower platform 250 comprises lower ring 252 telescopically engaging pipe section 34. Lower ring 252 is connected by welding or other suitable means (not shown) to pipe mating section 106 of male member 62. Lower platform 250 further comprises horizontal member 256. Horizontal member 256 has an opening coaxial with lower ring 252 and of sufficient size to telescopically receive pipe mating section 106 therein. Horizontal member 256 is connected by welding or other suitable process (not shown) to lower ring 252. Openings 254 are provided in horizontal member 256. Openings 254 are dimensioned to receive choke and kill lines 38, 40 therein. Lower platform 250 further comprises reinforcing members 270 positioned at the intersection 272 of lower ring 252 and horizontal member 256 by welding or other suitable process. Members 270 are dimensioned to distribute force moments from loads on horizontal member 256 to lower ring 252 without buckling.

The sections of choke line 38 and kill line 40 are also suspended in fixed relation to female member 64 and nut 74 middle platform 274, upper platform 276, pipe guide 278, and pipe nut 280.

Middle platform 274 comprises horizontal body portion 282 having center opening 283 therethrough substantially coaxial with nut 74. Center opening 283 is dimensioned for telescopically, rotatably receiving beveled lower portion 203 of nut 74 therein. Center opening 283 includes upwardly facing inner beveled edge 288 of slope substantially the same as the slope of beveled lower portion 203 of nut 74. The largest diameter of beveled edge 288 is less than the diameter of middle body portion 100 of nut 74. Horizontal body portion 282 also has two extensions 284 thereon. Extensions 284 have openings 286 therein. Openings 286 are dimensioned to permit the telescopic insertion of choke and kill lines 38, 40 in the openings 286 but not permit collars 262, 264 to pass therethrough.

Upper platform 276 comprises horizontal body portion 290 having center opening 293 therethrough substantially coaxial with nut 74. Center opening 293 is dimensioned for telescopically, rotatably receiving outwardly facing conical surface 181 of nut 74 therein. Center opening 293 includes downwardly facing inner beveled edge 298 of slope substantially the same as the slope of outwardly facing conical surface 181 of nut 74. The largest diameter of beveled edge 298 is less than the diameter of middle body portion 100 of nut 74. Horizontal body portion 290 also has two extensions 294 thereon. Extensions 294 have openings 296 therein. Openings 296 are dimensioned to permit the telescopic insertion of choke and kill lines 38, 40 in the openings 286 but not permit nuts 280 therethrough.

The smallest inner diameters of beveled sections 288, 298 are dimensioned to permit relative travel of nut 74 with respect to platforms 274, 276 for insertion of ends 258, 260 into openings 266, 268 respectively of collars 262, 264 respectively after nut lugs 92 have passed through slots 148.

Pipe guide 278 comprises horizontal body portion 300 having center opening 303 therethrough substantially coaxial with female member 64. Opening 303 is dimensioned to permit telescopic insertion of pipe mating section 152 of female member 64. Horizontal body portion 300 is connected to pipe mating section 152 of female member 64 by welding or other suitable means. Pipe guide 278 also has two extensions 304 thereon. Extensions 304 have outwardly facing arcuate sections 306, including retainer fingers 308 with a radius of curvature sufficient to permit close fitting of choke and kill lines 38, 40 therein.

Pipe nuts 280 have cylindrical shapes with bores 309 therethrough. Bores 309 are dimensioned to permit the telescopic insertion of choke and kill lines 38, 40 therethrough. Pipe nuts 280 are of a thickness permitting support of the weight of the choke and kill line sections 38, 40 thereon. The weight of the choke and kill lines 38, 40 is transmitted by nuts 280 to horizontal member 290 supporting nuts 280. Nuts 280 are attached to choke and kill lines 38, 40 by screw connection, welding or other suitable means. The location of such attachments is at a point that maintains the distance between upwardly facing shoulders 310 of collars 262, 264 and downwardly facing shoulders 312 of pipe nuts 280 approximately equal to the distance between downwardly facing surfaces 314 of extensions 284 and the upwardly facing surfaces 316 of extensions 292.

Make-up Tool

Referring now to FIGS. 7, 8, and 9, there is shown make-up tool 318 used for forcing shoulder 76 of lugs 92 of nut 74 in contact with surface 80 of lugs 88 of male member 62 to preload connection 36. Make-up tool 318 comprises lug holder 320, screw pin 322, and block 324.

Lug holder 320 has lower portion 326 and upper portion 334. Lower portion 326 includes a threaded bore 328 extending longitudinally therethrough. Smooth counterbore 330 is formed substantially coaxial with bore 328 by drilling or other means. Counterbore 330 is of larger diameter than bore 328 forming thread shoulder 332 therebetween. Lug holder 320 also includes corner section 333 which is a cut out portion of lower section 326. It has horizontal surface 336 and vertical surface 338. Threaded bore 328 terminates at vertical surface 338.

Upper portion 334 includes open rectangular cut out 340 having vertical load bearing side 342, vertical non-load bearing side 345, and horizontal upward facing bottom 347. The length of vertical sides 342, 345 and the width of bottom 347 are such that lug 92 may fit loosely into open rectangular cut out 340.

Screw pin 322 includes head 343 suitable for mechanical or hydraulic turning, such as, for example, a hexogonal head. Screw pin 322 also includes smooth cylindrical body 344 attached to and substantially coaxial with head 343. Body 344 is dimensioned to permit telescopic enclosure within counterbore 330 but not pass beyond shoulder 332. Screw pin 322 further includes smooth reduced diameter section 346 attached to and substantially coaxial with body 344. Substantially curved shoulder 348 is formed at the connection between cylindrical body 344 and section 346. Reduced diameter section 346 is dimensioned to permit its passage telescopically within the inner diameter of the threads of threaded section 328. Screw pin 322 also includes threaded bolt 350 having thread of the same pitch as threaded section 328. Threaded bolt 350 is attached to and substantially coaxial with reduced diameter section 346. Threaded bolt 350 is dimensioned and pitched to pass through smooth section 330 and engage threaded section 328. Screw pin 322 further includes bolt extension 352 attached to and substantially coaxial with threaded bolt 350. Bolt extension 352 is dimensioned to permit it to telescopically pass within the inner diameter of the threads of threaded section 328.

Block 324 comprises cylindrical extension section 354 attached by swedge section 356 to main body 358. The diameter of extension section 354 is such that it may be inserted within holes 254 of horizontal member 256 of lower platform section 250. Main body 358 includes upper horizontal surface 368, upper vertical sides 360, lower beveled sides 362, and horizontal bottom 364. Horizontal bottom 364 connects to swedge section 356. Main body 358 further includes partial bore 366 having face 367 at its interior end. Face 367 and bore 366 are positioned in block 324 to be substantially coaxial with bore 328 when horizontal surface 364 is in substantial contact with horizontal member 256 and cylindrical extension section 354 is in hole 254. Bore 366 is dimensioned to telescopically receive bolt extension 352 but not threaded bolt 350. The length of bolt extension 352 is greater than the depth of partial bore 366 of block 324. The height from horizontal surface 364 to horizontal surface 368 is substantially equal to the length of vertical side 338 of lug holder 320. The width of horizontal surface 364 is such that horizontal surface 364 does not extend into hole 254. During use of the tool, block 324 is held in fixed relation to platform 250 by engagement of extension 354 with the sides of hole 254.

The overall length of bolt 322 from shoulder 348 to the outward facing end of bolt extension 352 is such that when block 324 is fixed with respect to platform 250 and shoulder 348 contacts with shoulder 332, through rotation of head 343, holder 320 will have moved, such as, for example, one-quarter of an inch, with respect to block 324. The distance of the movement of holder 320 relative to block 324 must be such as to force shoulder 76 of lug 92, through load surface 342, to climb surface 80 and preload the connection to the desired value set by the position of locks 220.

Materials of Construction and Coatings

Nut 74, male member 62, and female member 64 are usually made of alloy steel.

Further, parts in sliding contact should be of different hardness to prevent galling. Bearing in mind the principle that a chain is no stronger than its weakest link, the materials for the nut 74, male member 62, and female member 64 should be chosen to carry the desired preload. For example, the preload may be set so that the pipe yields in tension before the connector faces 68, 126 move apart, thereby insuring that the connector will be at least as strong as the pipe. For the preload criteria given in this example and presuming riser sections 34 comprise pipe whose size is eighteen and three-fourths inches by seven-sixteenth inch wall thickness and whose composition has a yield strength of 52,000 pounds per square inch, a suitable selection for the yield strength of the nut would be 120,000 pounds per square inch and for the yield strength of the male member 62 and female member 64 would be 80,000 pounds per square inch.

Method of Use

In assembling connector 36, lower platform 250, with holes 254 telescopically receiving and supporting choke line 38 and kill line 40, is attached to male member 62. Pipe mating section 106 of male member 62 is then attached by welding or other means to lower pipe section 34 (FIG. 2). Female member 64 is telescopically inserted within beveled section 101 of nut 74 until surface 78 of nut 74 comes to rest on surface 82 of female member 64 and is held there by gravity thereby activating seals 186, 194. Pipe mating section 152 of female member 64 is connected by welding or other means to the upper pipe section 34.

Upper platform 276 is moved along nut 74 until surface 298 meets surface 181 preventing further downward movement of upper platform 276. Choke line 38 and kill line 40 are then inserted into holes 286, 296 of middle platform 274 and upper platform 276 respectively until surfaces 310 of collars 262, 264 respectively contact surfaces 314, 315 respectively of middle platform 274. Middle platform 274 is then moved along nut 74 until surface 288 meets surface 203. Male member 62 is thereby stabbed into nut 74 while ends 258, 260 are inserted into holes 266, 268 respectively. Adjacent sections 38 and 40 are then attached by welding or other suitable means, completing the make up of the choke line 38 and kill line 40 sections. Nut 74 is then aligned so that lugs 92 are opposite slots 148 and then lowered over male member 62, making a quick stab connection. Nuts 280 are then partially tightened to hold choke line 38 and kill line 40 in place, thereby fixing the relative position of middle platform 274 with respect to upper platform 276. Nuts 280 are adjusted to give sufficient slack to permit completing the make-up of the connections. In this manner, platforms 274, 276 are prevented from falling off nut 74 while permitting nut 74 to rotate with respect to platforms 274, 276. Pipe guide 278 is attached by welding or other means to pipe mating section 152 of female member 64 with choke line 38 and kill line 40 fitting against outwardly facing arcuate surfaces 306 of extensions 304.

Nut 74 is then rotated relative to platforms 250, 274, 276 and members 62, 64 until lugs 92 contact lugs 88. Make-up tools 318, may then be located at opposite sides of nut 74 and employed to drive nut 74 to a preloaded condition. To install tools 318, extensions 354 of block 324 of tools 318 are inserted into two holes 254 of lower platform 250 circumferentially spaced apart by 180°. Lug holders 320 are installed with opposite facing lugs 92 bounded by cut outs 340. Screw pin 322 is inserted into counterbore 330 for each and threaded in bore 328 until extension 352 contacts the opposite face 367 of block 324. Force application means (not shown) is then applied to head 343, forcing extension 352 against face 367 and surface 342 of upper portion 334 against side 206 of lug 92. This force will rotate nut 74 clockwise (as viewed from above the female member 64) relative to the rest of the assembly. As shoulder 76 climps surface 80, the connection will tighten. Nut 74 is thus placed in tension while male 62 and female 64 members are placed in compression, thereby preloading connector 36. The vertical orientation of surfaces 206, 342 prevents a horizontal component of force from being introduced to the connection through the lugs at the location of the make-up tool.

After the connector 36 has been preloaded to the desired load set by the location of locks 220, threaded sections 224 are rotated by head 222 through holes 218 of nut 74. Lugs 226 of screws 220, spaced 180° apart, thereby engage the sides 138 of lugs 88 and prevent any counter clockwise movement of the nut 74 relative to the male member 62. Safety latches 228 are then released to prevent the locks 220 from completely backing out. After the nut 74 is locked in place, the make-up tools 318 may be removed.

The connector 36 is disconnected by first disengaging latch 228 and lock bolt 220. The make-up tool 318 is installed as previously described but oriented in the opposite direction for locking. The make-up tool 318 is then operated as previously described until nut 74 can be rotated by hand to the position where lugs 92 align with slots 148 and can be withdrawn. The choke 38 and kill 40 lines should also be disconnected before the components of the connection are disengaged.

Although the system described in detail supra has been found to be most satisfactory and preferred, many variations in structure and method are possible. For example, hydraulic actuation of nut 74 to cause engagement of lugs 88 with lugs 92 may be used. A gear mechanism with a ratchet mounting could be used to preload the connection 36. Male member 62 and female member 64 could be inverted. Any materials having sufficient yield factors could be used based on the criteria previously discussed. The lock may be two tabs with a bolt therebetween. Also, a hydraulic driven tool may be used for actuation of nut 74 to cause engagement of lugs 88 with lugs 92. The hydraulic tool would have two hydraulic actuators mounted on a U-shaped frame that could be placed around the nut 74. The U-shaped frame would have a pin in each leg to fit in two holes 254 of platform 250 circumferentially spaced apart by 180°. The hydraulic actuators would grasp the nut 74 at opposite facing lugs 92. One actuator would pull while the second would push on the lugs 92 to rotate the nut 74 clockwise relative to the rest of the assembly.

The above are merely exemplary of the possible changes or variations.

Because many varying and different embodiments may be made within the scope of the inventive concept herein taught and because many modifications may be made in the embodiment herein detailed in accordance with the descriptive requirements of the law, it should be understood that the details herein are to be interpreted as illustrative and not in a limiting sense.

What is claimed as invention is:

1. A connector joint for use with underwater risers, including choke and kill line pipe sections and a first and a second drill string pipe section, to connect a wellhead on the ocean bottom to a floating drilling rig, comprising:

a male member having means for connection to such first pipe section, said male member having a shoulder;

a female member having means for connection to such second pipe section, said female member having a shoulder and an opening for telescopically receiving said male member until said male shoulder contacts said female shoulder; and compressive means for urging said shoulders together under compressive load for holding said male and female members in compression, said compressive means held in tension while said shoulders are held in compression, and said compressive means including - a rotatable nut, and means for supporting such choke and kill line sections while permitting rotation of said nut.

2. The connector of claim 1 wherein there is further included seal means for fluid tight flow connection of said male and female members, said seal means including a seal ring mounted on said male member and said seal means being actuated independently of said compression means.

3. The connector of claim 1 wherein said male member and said female member are free of interengageable surfaces between said shoulders that could prevent tensioning of said compressive means over the full axial extent of said compressive means.

4. The connector of claim 1 wherein said nut has a plurality of lugs and said male member has a plurality of lugs and said lugs include means for coacting with each other for holding said male and female members in compression.

5. The connector of claim 4 wherein said lugs form two sets of partial threads.

6. The connector of claim 1 wherein said nut has a plurality of lugs and said female member has a plurality of lugs and said lugs include means for coacting with each other for holding said male and female members in compression.

7. The connector of claim 1 wherein said compressive means includes means for preloading said shoulders to prevent separation of said shoulders upon the application of a force to such drill string pipe sections equal to the yield strength of such drill string pipe sections.

8. The connector of claim 1 wherein said nut includes means for rotationally moving said nut relative to said male and female members and there is further included a tool having means for actuating said means for rotating said nut.

9. The connector of claim 8 wherein said actuating means adjusts said compressive load in a continuous manner until a desired preload is reached.

10. The connector of claim 8 wherein said nut further includes:

a lock, said lock being located on said nut; and means for actuating said lock and preventing movement of said nut.

11. The connector of claim 10 wherein said lock is independent of said compressive means and said tool.

12. The connector of claim 1 wherein said compressive means urges said shoulders together without rotational movement of such choke and kill line pipe sections.

13. The connector of claim 1 wherein the locus of points of contact between said female member and said male member are in a plane perpendicular to the axis of said female member and male member and forms a ring whose thickness is substantially equal to the thickness of said shoulder of said male member.

14. A connector joint for use with underwater risers, including choke and kill line pipe sections and a first and a second drill string pipe section, to connect a wellhead on the ocean bottom to a floating drilling rig, comprising:
   a pin connected to such first drill string pipe section, said pin having a shoulder;
   a box connected to such second drill string pipe section, said box having a shoulder;
   a rotatable nut surrounding said pin and said box having means for compressing said shoulders together; and
   means for supporting such choke and kill line sections while permitting rotation of said nut.

15. The connector of claim 14 wherein there is further included seal means for fluid tight flow connection of said pin and box, said seal means including a seal ring mounted on said pin and said seal means being actuated independently of said nut.

16. The connector of claim 5 wherein said nut has a plurality of lugs and said pin has a plurality of lugs and said lugs include means for coacting with each other for holding said pin and box in compression.

17. The connector of claim 16 wherein said lugs form two sets of partial threads.

18. The connector of claim 17 wherein said nut includes means for rotationally moving said nut relative to said male and female members and there is further included a tool having means for actuating said means for rotating said nut.

19. The connector of claim 18 wherein said actuating means permits adjustment of the force compressing said shoulders in a continuous manner until a desired preload is reached.

20. The connector of claim 19 wherein said nut further includes a lock, said lock being located on said nut; and
   means for actuating said lock and preventing movement of said nut.

21. The connector of claim 20 wherein said nut preloads said shoulders to prevent separation of said shoulders upon the application of a force to such drill string pipe sections equal to the yield strength of such drill string pipe sections.

22. The connector of claim 21 wherein said location of said lock on said nut determines said preload force.

23. The connector of claim 21 wherein said lock is independent of said tool.

24. The connector of claim 23 wherein said nut urges said shoulders together without rotational movement of such choke and kill line pipe sections.

25. The connection assembly of claim 24 wherein said first member includes a platform and said first tool and said second tool are mounted oppositely facing on said platform.

26. A pipe section for use in making connection to like pipe sections at its ends, comprising:
   a marine riser pipe section;
   a first member at one end of said pipe section having a pin;
   a second member at the other end of said pipe section having a box correlative to said pin;
   a choke line pipe section;
   a kill line pipe section;
   platform means for aligning said choke and kill line pipe sections; and
   compressive means for urging said second member and a correlative first member in compression, said compressive means including:
   a rotatable nut, and
   means for supporting said choke and kill line pipe sections while permitting rotation of said nut.

27. The connector of claim 26 wherein there is further included seal means for fluid tight flow connection of said first and second members, said seal means including a seal ring mounted on said first member and said seal means being actuated independently of said compressive means.

* * * * *

UNITED STATES PATENT AND TRADEMARK OFFICE
CERTIFICATE OF CORRECTION

PATENT NO. : 4,330,140
DATED : May 18, 1982
INVENTOR(S) : J. E. Hampton

It is certified that error appears in the above—identified patent and that said Letters Patent is hereby corrected as shown below:

Column 18, lines 18-21; delete claim 25 and insert--

25. A tool for preloading marine riser section connections wherein the connections include a first member having a first platform fixed thereto and a first shoulder, a second member having a second platform fixed thereto and a second shoulder, and a rotating nut surrounding the members and connected to and holding together the members by the shoulders, comprising:

means for locating and removing said tool in fixed relation to such platforms; and means for rotating said nut. --.

Signed and Sealed this

Seventeenth Day of May 1983

[SEAL]

Attest:

DONALD J. QUIGG

Attesting Officer     Acting Commissioner of Patents and Trademarks